(12) United States Patent
Matsui

(10) Patent No.: US 7,251,088 B2
(45) Date of Patent: Jul. 31, 2007

(54) HARD DISC DEVICE

(75) Inventor: Tsutomu Matsui, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 11/175,194

(22) Filed: Jul. 7, 2005

(65) Prior Publication Data

US 2006/0007794 A1 Jan. 12, 2006

(30) Foreign Application Priority Data

Jul. 9, 2004 (JP) .......................... P.2004-203142

(51) Int. Cl.
*G11B 5/02* (2006.01)

(52) U.S. Cl. .............................. 360/55; 360/69; 360/75

(58) Field of Classification Search ...................... None
See application file for complete search history.

(56) References Cited

U.S. PATENT DOCUMENTS

| | | | | |
|---|---|---|---|---|
| 4,965,691 A * | 10/1990 | Iftikar et al. | ................. | 360/133 |
| 5,235,481 A * | 8/1993 | Kamo et al. | ............. | 360/97.01 |
| 5,414,574 A * | 5/1995 | Boutaghou et al. | ...... | 360/97.01 |
| 5,652,766 A * | 7/1997 | Matsumura et al. | ......... | 375/295 |
| 6,018,775 A * | 1/2000 | Vossler | ........................... | 710/1 |
| 6,256,688 B1 * | 7/2001 | Suetaka et al. | ................ | 710/73 |
| 6,633,445 B1 * | 10/2003 | Wilke | ........................... | 360/55 |
| 2004/0107355 A1 * | 6/2004 | Sakurai et al. | .............. | 713/193 |
| 2005/0057849 A1 * | 3/2005 | Twogood et al. | ........ | 360/97.02 |

FOREIGN PATENT DOCUMENTS

| | | |
|---|---|---|
| JP | 6-267239 | 9/1994 |
| JP | 8-306178 | 11/1996 |
| JP | 2001-202144 | 7/2001 |
| JP | 2003-178572 | 6/2003 |
| JP | 2003-196964 | 7/2003 |
| JP | 2003-272367 | 9/2003 |
| JP | 2003-157520 | 5/2005 |

* cited by examiner

*Primary Examiner*—K. Wong
(74) *Attorney, Agent, or Firm*—Morgan, Lewis & Bockius LLP

(57) ABSTRACT

A portable hard disc device which is read by a recording and/or reproducing apparatus, including: a disc for recording and/or reproducing; a head slider for recording and/or reproducing the disc; an arm mechanism for moving the head slider to a predetermined position; a voice coil motor type coil for driving the arm mechanism by being driven by an external magnetic field generated by magnets provided in the recording and/or reproducing apparatus and a current supplied from a power circuit; a spindle for rotating the disc after the disc is fixed; and a power circuit for supplying a current to the voice coil motor type coil.

5 Claims, 5 Drawing Sheets

HARD DISC DEVICE

BACKGROUND OF THE INVENTION

1. Field of the Invention

The present invention relates to a hard disc device, and in particular, to a handheld or portable hard disc device.

2. Description of the Related Art

A portable hard disc device can carry a huge volume of information compared to an optical disc such as a DVD (Digital Versatile Disc), a blue-ray disc, and can read information at high speed. However, the hard disc device is required to have a closed structure together with a disc, a head slider, and an arm unit for moving the head slider, in order to prevent dust from intruding, and the hard disc device has a large number of parts. Therefore, there is high probability that failure may be caused by vibration of a mobile phone or repeated use. Moreover, a large number of parts make it difficult to realize the reduction in size, weight and cost.

JP-A-2003-272367 discloses a potable hard disc device in which a case which accommodates a disc, a head slider, an arm mechanism for holding and moving the head slider, and a circuit unit for controlling the movement of the arm mechanism is accommodated in a housing with a shock absorber interposed between the case and housing. The portable hard disc is electrically connected to an external computer via terminals provided in the housing.

JP-A-2003-196964 discloses an information storage apparatus having a hard disc unit, a rechargeable battery, an electromagnetic-induction recharging unit, and a communication unit. The electromagnetic-induction recharging unit receives power supply from the outside without contact, and recharges the rechargeable battery periodically. Then the rechargeable battery supplies power to the hard disc unit. The communication unit transmits and receives data to and from external apparatuses such as a PC or a mobile phone without electric contact, and mediates transmission or reception of data between the external apparatuses and the hard disc unit.

JP-A-2003-178572 discloses a hard disc unit which is reproduced by a CD changer corresponding to the hard disc unit. The CD changer corresponding to the hard disc unit can reproduce a CD magazine in the same manner as a conventional CD changer and the hard disc unit. The hard disc unit disclosed in JP-A-2003-178572 has almost the same appearance as the CD magazine, and has connectors to be electrically connected to the CD changer corresponding to the hard disc unit.

JP-A-8-306178 discloses a removable disc cartridge and a system body on which the disc cartridge is mounted. The disc cartridge is composed of cases A and B, the case A has a disc and a head slider therein, and the case B has a primary magnetic disc directly connected to a disc supporting pole, a secondary magnetic disc for controlling the location of the head slider therein. In addition, electric signal type connectors for transmitting and receiving data between the disc cartridge and the system body are provided in the cases A and B. A motor for rotating a disc and a voice coil motor type coil motor is arranged at the system body, that is, outside the disc cartridge. The disc cartridge is mounted on the system body, then the disc is rotated after the rotating shaft of the disc rotating motor of the system body is fitted into the primary magnetic disc, and then the location of the head slider is controlled after the voice coil motor type coil motor of the system body is fitted into the second magnetic disc.

JP-A-6-267239 discloses a locking mechanism of a small handheld or portable hard disc device. The locking mechanism fixes a disc by pressing a pad against an outer peripheral end of the disc while the disc is not rotating. The locking mechanism fixes the disc by pressing pads against at least two spots which are hard to be nodes for vibration of the disc.

JP-A-2001-202144 discloses a power unit for supplying power to a hard disc device after receiving power supply from a USB 20. While the power unit regulates power bound for the hard disc device by extracting only the current below 500 mA from the power supply from the USB 20, the power unit recharges an electric double-layer capacitor to a predetermined extent. When the recharging capacitance reaches a predetermined capacitance, the current below 500 mA from the USB 20 and the output current from the electric double-layer capacitor are supplied to the hard disc device, so that the shortage of driving power is covered by using only the output from the USB 20 having a defined power capacitance.

JP-A-2003-157520 discloses a method of forming a disc by nano-imprinting. In the nano-imprinting method, a buffer layer is disposed in a position corresponding to a recessed/projected pattern formation area (information forming area) of the disc, and then the recessed/projected pattern of the disc is transferred to a transfer target substrate.

Since the above-described hard disc device has a large number of components, it is inappropriate for preserving recording information for a long time. Moreover, a large number of parts make it difficult to realize the reduction in size and weight, thus portability should be enhanced. A large number of parts make it difficult to realize in cost as well, thus the cost should be lowered.

SUMMARY OF THE INVENTION

It is an object of the present invention to provide a hard disc device suitable for preserving recording information for a long time and having improved portability, at an affordable price.

The hard disc device according to a first aspect of the invention is a portable read-only hard disc device which can be read by a recording and/or reproducing apparatus. The hard disc device includes a disc on which information is recorded by recess and projection formed by nano-imprinting, a read-only head slider, a secondary coil which constitutes a transformer together with a primary coil provided in the recording and/or reproducing apparatus, a power circuit having a rechargeable battery which accumulates power supplied from the secondary coil, an arm mechanism for moving the head slider to a predetermined position, a voice coil motor type coil for driving the arm mechanism after being driven by a current supplied from the power circuit and magnets provided in the recording and/or reproducing apparatus, a spindle which is driven without contact by a spindle motor provided in the recording and/or reproducing apparatus, after the disc is fixed, and a communication unit for transmitting and receiving reproducing signals and servo signals from the disc, and driving signals bound for the voice coil motor type coil to and from the recording and/or reproducing apparatus.

In the hard disc device, since magnets for driving the voice coil motor type coil and the spindle motor are disposed in an external apparatus, the number of parts can be decreased, and the rate of failure or of exchange can be drastically reduced. In addition, since the voice coil motor type coil is driven without contact with the outside, and the spindle is rotated by the external spindle motor without contact, deterioration due to wear of parts can be prevented. By decrease in the number of parts and by prevention of the deterioration due to wear of parts, the hard disc device suitable for preserving recording information for a long time can be provided.

Since a heavy magnet and the spindle motor are not built-in, the reduction in size and weight can be achieved, and thus portability can be improved. Moreover, the decrease in the number of parts can reduce the cost.

In addition, since power is supplied without contact and signals are transmitted and received by optical communication or by radio high-frequency transmission, connectors for supplying power and for transmitting and receiving signals are omitted, which further decreases the number of parts. Moreover, the connection made by the connectors is omitted as well, which makes it possible to prevent the deterioration due to wear of the connectors.

By fast transferring by the nano-imprinting, huge amount of video data such as movies can be recorded on a disc at an affordable price and at high speed.

The hard disc device according to a second aspect of the invention is a portable hard disc device which can be read by a recording and/or reproducing apparatus. The hard disc device includes a disc for recording and/or reproducing, a head slider for recording and/or reproducing the disc, an arm mechanism for moving the head slider to a predetermined position, a voice coil motor type coil for driving the arm mechanism by being driven by an external magnetic field generated by magnets provided in the recording and/or reproducing apparatus and a current supplied from a power circuit, a spindle for rotating the disc after the disc is fixed, and a power circuit for supplying a current to the voice coil motor type coil.

In the hard disc device, since magnets for driving the voice coil motor type coil are disposed in external apparatuses, the number of parts can be decreased. Moreover, since the voice coil motor type coil is driven without contact with the external apparatuses, deterioration due to wear of parts can be prevented. By decrease in the number of parts and by prevention of the deterioration due to wear of parts, the hard disc device suitable for preserving recording information for a long time can be provided.

Since a heavy magnet is not built-in, the reduction in size and weight can be achieved, and thus portability can be improved. Moreover, the decrease in the number of parts can reduce the cost.

The hard disc device according to a third aspect of the invention is the hard disc device according to the second aspect in which the spindle is driven by a spindle motor provided in the recording and/or reproducing apparatus without contact.

In the hard disc device, since the spindle motor is provided in external apparatuses, the number of parts can be decreased. In addition, since the rotation of the external spindle motor is transmitted to the spindle without contact, deterioration due to wear of a transmission mechanism which transmits the rotation of the spindle motor to the spindle can be prevented.

Since the spindle motor is not built-in, the reduction in size and weight can be achieved, and thus portability can be improved. Moreover, the decrease in the number of parts can reduce the cost.

The hard disc device according to a fourth aspect of the invention is the hard disc device according to the second or third aspect which further includes the communication unit for transmitting and receiving reproducing signals and servo signals from the disc, and driving signals bound for the voice coil motor type coil to and from the recording and/or reproducing apparatus. The power circuit receives power supply from the recording and/or reproducing apparatus without contact.

Since power is supplied without contact and signals are transmitted and received by optical communication or by radio high-frequency transmission, connectors for supplying power and for transmitting and receiving signals are omitted, which further decreases the number of parts. Moreover, the connection made by the connectors is omitted, which makes it possible to prevent the deterioration due to wear of the connectors.

The hard disc device according to a fifth aspect of the invention is the hard disc device according to any one of the second to fourth aspects. The disc is used as a reproducing-only ROM.

If the hard disc device is reproducing-only, the head slider is enough as a head for reading alone, thus the structure of an amplifier for amplifying recording signals can be omitted, which can further reduce the number of parts.

The hard disc device according to a sixth aspect of the invention is the hard disc device according to any one of the second to fourth aspects. The disc includes a ROM area to be used as a read-only ROM, and an area to be used as a readable and writable RAM area.

According to the hard disc device, a user can be provided with the RAM area in which the user can freely write information as well as huge amounts of read-only data recorded in the ROM area.

According to the aspects of the present invention, it is an advantage to provide the hard disc device suitable for preserving recording information for a long time and having improved portability, at an affordable price.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
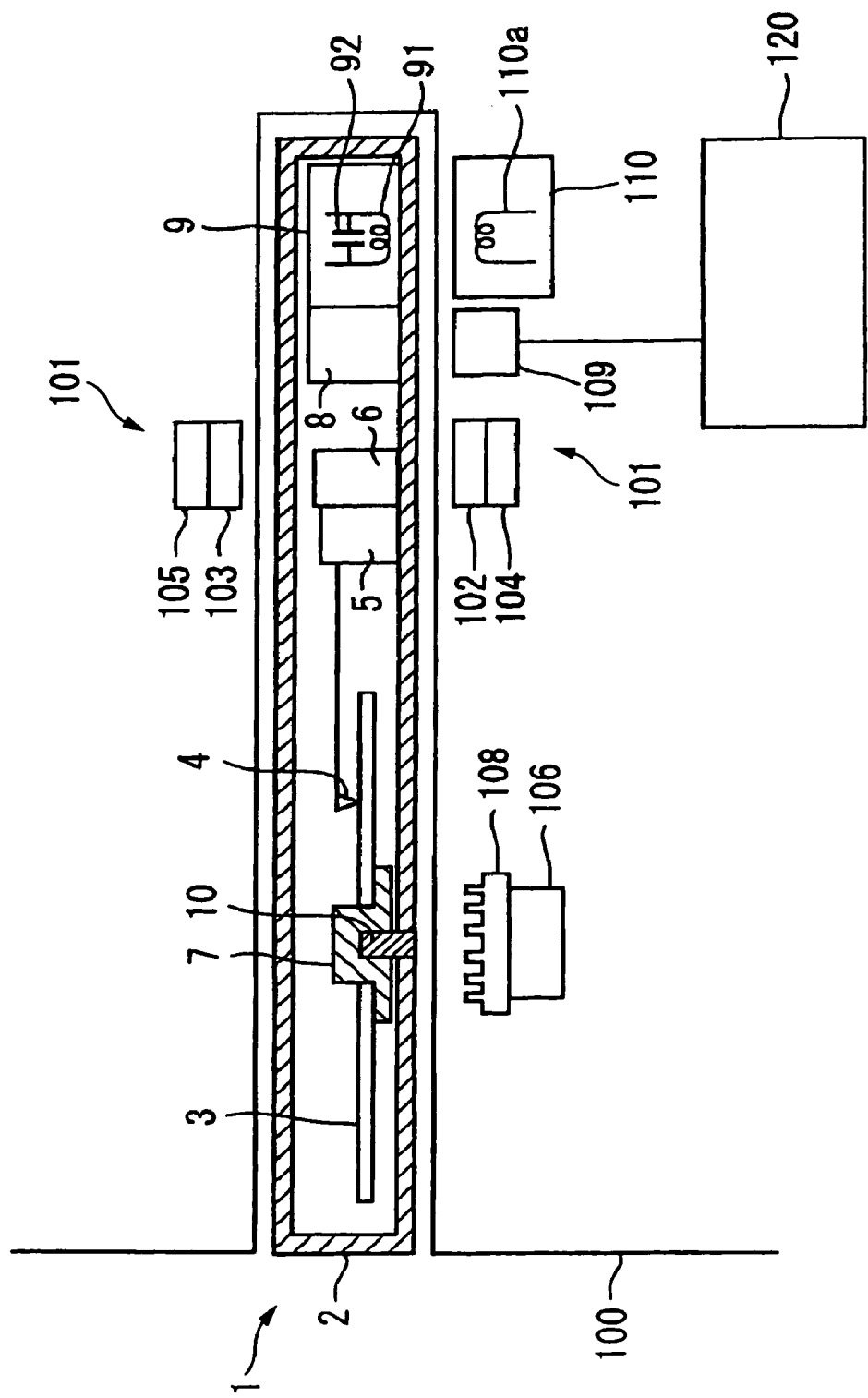
FIG. 1 is a sectional view showing a schematic structure of a hard disc device and a recording and/or reproducing apparatus.

FIG. 1 is a sectional view schematically showing the whole structure of a portable hard disc device related to an embodiment of the present invention. The hard disc device includes components such as a disc 3, a spindle 7, etc. mounted on a rectangular box-shaped housing 2. The disc 3, the spindle 7, etc. will be described later.

The hard disc device 1 is a read-only hard disc device and mounted on a recording and/or reproducing apparatus 100 (hereinafter referred to as a recording/reproducing apparatus 100), and reads recording information.

The hard disc device 1 includes the disc 3, a head slider for reading information of the disc 3, an arm mechanism 5 for moving the head slider 4 to a predetermined position, a voice coil motor type coil 6 (hereinafter referred to as a VCM coil 6) for actuating the arm mechanism 5, a spindle 7 for holding the disc 3, a communication unit 8 for transmitting data to the recording/reproducing apparatus 100 and receiving data from the recording/reproducing apparatus 100 by optical communication or by radio high-frequency transmission, and a power circuit 9 for supplying power to each part.

The recording/reproducing apparatus 100 includes a VCM magnet for generating an external magnetic field which penetrates the VCM coil 6, a spindle motor 106 for rotating the spindle 7 without contact, a communication unit 109 for transmitting data to the communication unit 8 and receiving data from the communication unit 8 by optical communication or by radio high-frequency transmission, a signal processing circuit 120 for processing reproducing signals and servo signals received from the communication unit 109, and a power supplying circuit 110 for supplying power to the power circuit 9 without contact.

The disc 3 is a magnetic disc on which information is recorded by magnetism or a capacitance reading type disc on which information is recorded by recess and projection formed by nano-imprinting. The disc 3 is used as a read-only ROM. The diameter of the disc 3 is 3.5 in., 2.5 in., 1.8 in., 1.0 in., and 0.8 in. which are suitable for a portable hard disc.

When recess and projection is formed by nano-imprinting, information is transferred at high speed. Thus, huge amount of information such as movies can be recorded in the disc 3 at an affordable price and at high speed.

In an optical recording and reproducing technology, a surface recording density is at most 18 Gbpsi, whereas in a technology related to a hard disc, 100 to 500 Gbpsi of surface recording density can be achieved. Therefore, the memory capacity of the disc 3 is huge compared to an optical disc such as the DVD (Digital Versatile Disc) or the Blu-ray Disc. Accordingly, greater information can be recorded in the disc 3 compared to the optical disc.

In a case in which the disc 3 is a magnetic disc, the head slider 4 utilizes a GMR (Giant Magneto Resistive) head, a TMR (Spin Tunneling Magnetoresistive Effect) head, a CPPGMR (Current Perpendicular to Plane GMR) head, etc. In a case in which the disc 3 is formed by nano-imprinting, the head slider 4 utilizes the capacitance detecting type head. The head slider 4 approaches the surface of the disc 3 up to an interval below several tens of nanometers and reads recording information (capacitance) without contact.

Figure 2:
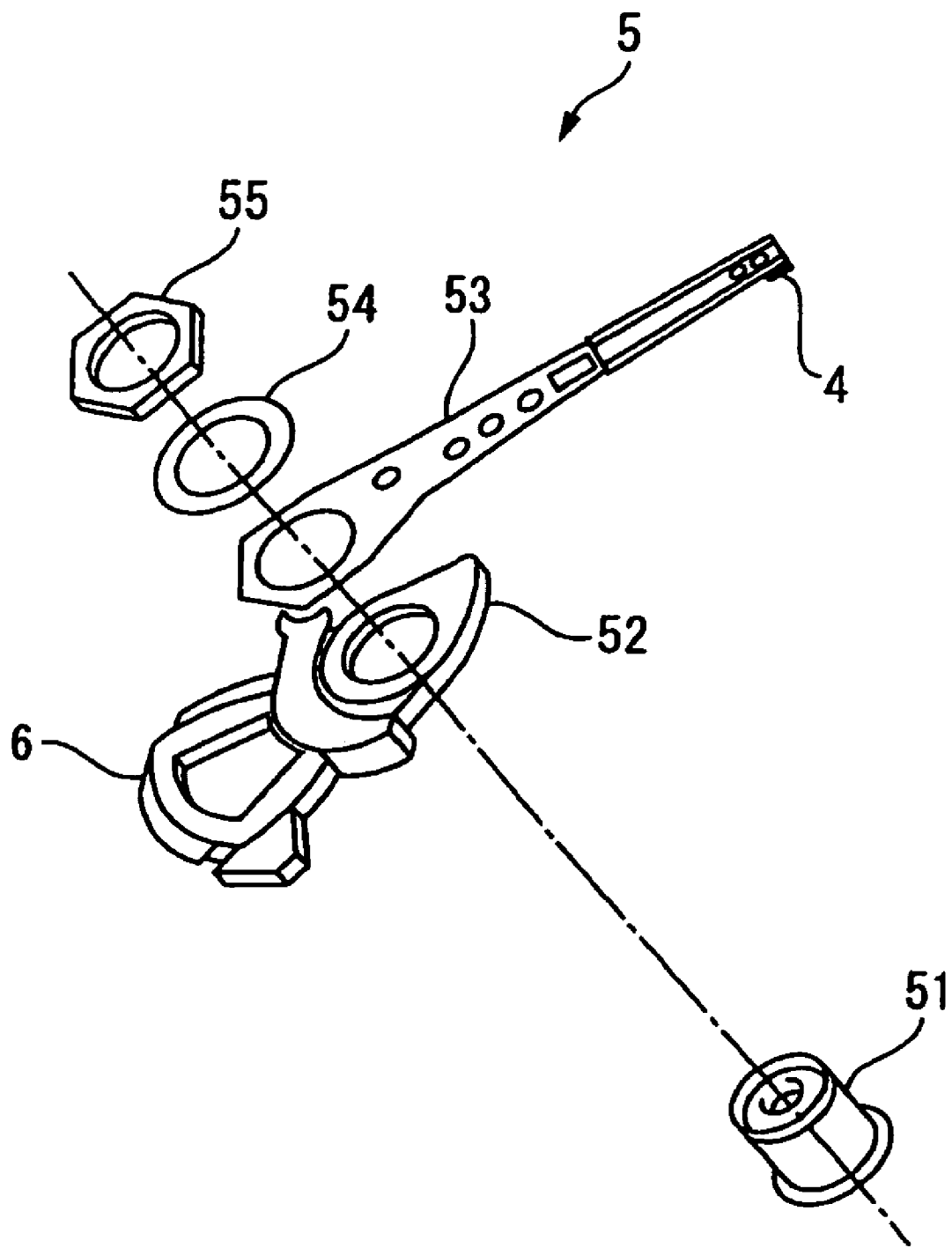
FIG. 2 is a view showing a structure of an arm mechanism.

As shown in FIG. 2, as main components, the arm mechanism 5 has a bearing unit 51 fixed to the bottom of the housing 2, a rotating part 52 to be inserted into the bearing unit 51, and an arm 53 to whose front end the head slider 4 is mounted. These components are fixed by a washer 54 and a nut 55. The rotating part 52 is rotatably supported by the bearing unit 51, and the VCM coil 6 is mounted to an outer periphery of the rotating part 52 (opposite to the head slider 4). The arm mechanism 5 is provided with an FPC (Flexible Print Circuit) which is not shown. The FPC connects the head slider 4 to the communication unit 8 via a preamplifier. Further, the FPC supplies a driving current to the VCM coil 6.

Figure 3:
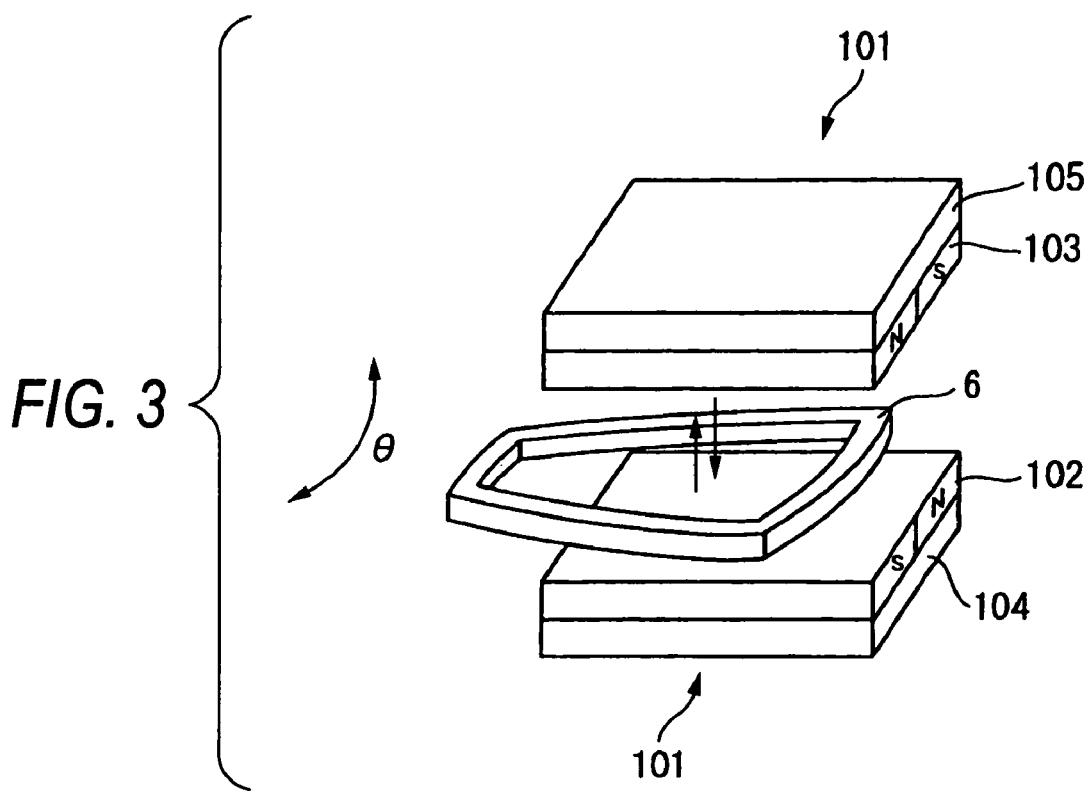
FIG. 3 is a view showing an arrangement of a VCM coil and a VCM magnet.

As described as above, the VCM coil 6 is mounted to the outer periphery of the rotating part 5 of the arm mechanism 5. By the rotation of the VCM coil 6, the location of the arm 53 and the head slider 4 of the arm mechanism 5 is controlled. When the hard disc device 1 is mounted on the recording/reproducing apparatus 100, as shown in FIG. 1 and FIG. 3, the VCM magnet 101 is disposed such that the VCM coil 6 is fitted therebetween. Although the illustration of the housing 2 is omitted in FIG. 3, the VCM magnet 101 is disposed outside the housing 2, that is, in the recording/reproducing apparatus 100, and the VCM magnet 101 generates an external magnetic field which penetrates the VCM coil 6 through the housing 2. A VCM driver (not shown) supplies a driving current to the VCM coil 6. The power circuit 9 supplies power to the VCM driver, and the VCM driver outputs a driving current based on driving signals received from the communication unit 8.

If a driving current flows to the VCM coil 6 while the VCM coil 6 is disposed amid the external magnetic field generated by the VCM magnet 101, a driving force to rotate the VCM coil 6 in a θ direction in FIG. 3 is generated. The VCM magnet 101 is composed of magnets 102 and 103 which are disposed to sandwich the VCM coil 6, yokes 104 and 105 for regulating magnetic fluxes of the magnets 102 and 103 to be concentrated on a desired area.

Figure 4A:
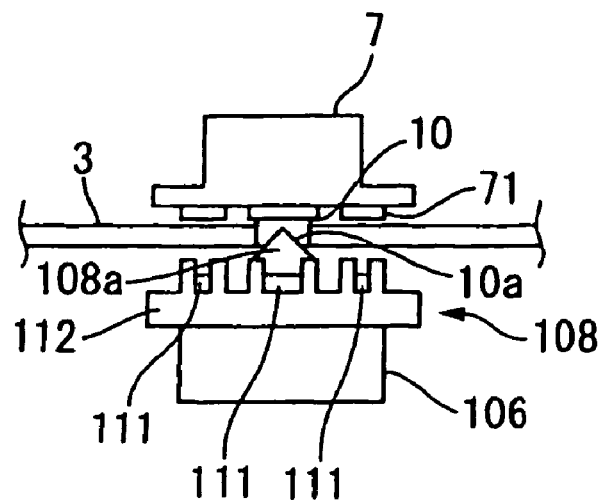
FIGS. 4A to 4C are views showing an arrangement of a spindle and a spindle motor.

The spindle 7 is formed of resin, etc., and is rotatably supported by a bearing 10 provided at the bottom of the housing 2 as shown in FIG. 4A. A disc-shaped magnetic plate 70 made of iron oxide is provided at the bottom face of the spindle 7, and a plurality of projections 71 is disposed at regular intervals at an outer periphery of the magnetic plate 70. The disc 3 is inserted into the spindle 7 and fixed thereto.

Figure 4B:
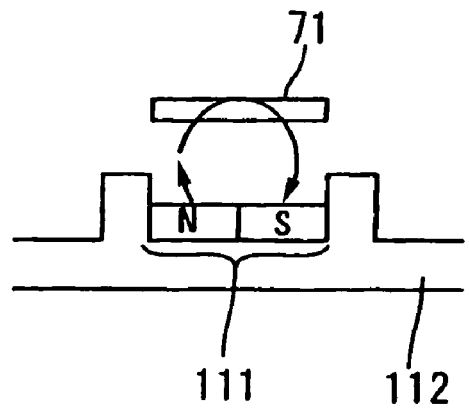
Figure 4C:
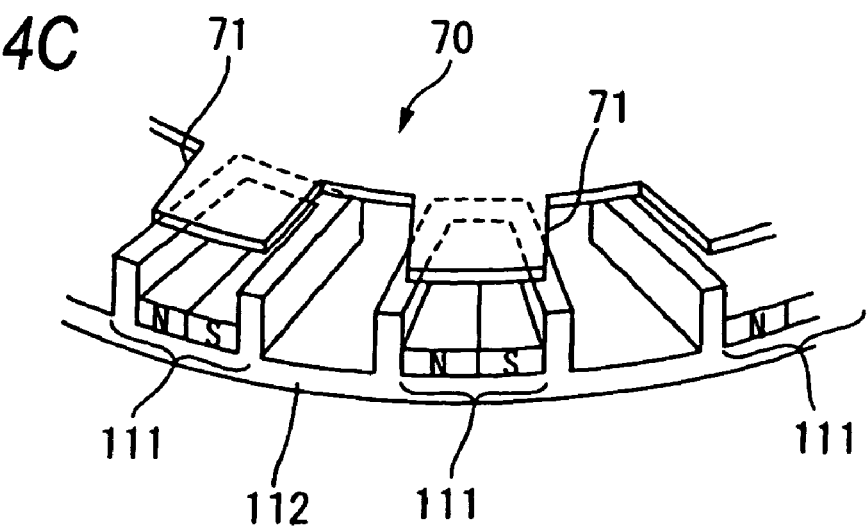

If the hard disc device 1 is mounted on the recording/reproducing apparatus 100, a magnetic rotating plate 108 is disposed below the spindle 7 with the bottom face of the housing 2 interposed between the magnetic rotating plate and spindle. A convex part 108a is arranged on the middle of the top face of the magnetic rotating plate 108, and as the convex part 108a is rotatably fitted into a concave part 10a of the bearing 10, the central position of the bearing 10 is aligned with the central position of the magnetic rotating plate 108. The magnetic rotating plate 108 is fixed to a rotating shaft of the spindle motor 106, and the spindle motor 106 rotates the magnetic rotating plate 108. The magnetic rotating plate 108 is composed of the projection 71 of the spindle 7, a plurality of magnets 111 disposed in the substantially same shape at regular intervals, and a disc-shaped yoke 112. Ribs for holding each magnet 111 is formed in the yoke 112. As shown in FIGS. 4B and 4C, by the magnetic coupling between the magnet 111 of the magnetic rotating plate 108 and the projection 71 of the spindle 7, the rotation of the spindle motor 106 is transmitted to the spindle 7 through the projection 71. That is, the rotation of the spindle motor 106 is transmitted to the magnetic rotating plate 108, and then the rotation of the magnetic rotating plate 108 is transmitted to the spindle 7 by a magnetic force without contact, whereby the disc 3 rotates.

The power circuit 9 constitutes a transformer together with a primary coil 110a provided in the power supplying circuit 110 of the recording/reproducing 100, and has a secondary coil 91 to which the primary coil 110a supplies power, a rechargeable battery 92 for accumulating power supplied from the secondary coil 91. The power circuit 9 includes a diode or the like for rectifying the AC voltage generated in the secondary coil 91. As the rechargeable battery 92, a battery with a small size and a high capacitance such as an electric double-layer capacitor, an aluminum electrolytic capacitor, and a tantalum capacitor is desirably used. Since the power circuit 9 receives power supplied from the outside of the housing 2 without contact and without using any connectors and cables, connectors and cables need not be provided for supplying power to the hard disc device 1.

The communication unit 8 transmits and receives signals to and from the communication unit 109 of the recording/reproducing apparatus 100 by optical communication or by radio high-frequency transmission. The communication unit 8 transmits reproducing signals and servo signals, which are output from the head slider 4 via the preamplifier, to the communication unit 109. In addition, the communication unit 8 receives driving signals bound for the VCM coil 6 from the communication unit 109.

In the hard disc device 1 of the embodiment, the spindle 7 is rotated by the spindle motor 106 without contact with the magnetic rotating plate 108 interposed therebetween, and the VCM coil 105 is driven without contact by the VCM magnet 101 arranged outside the housing. In addition, reproducing signals and servo signals read from the head slider 4 are transmitted to the recording/reproducing apparatus 100 from the communication unit 8 by optical communication or by radio high-frequency transmission. In the recording/reproducing apparatus 100, reproducing signals and servo signals are first received in the communication unit 109, and then processed in the signal processing circuit 120.

In the hard disc device 1 of the embodiment, since the VCM magnet 101 and the spindle motor 106 are disposed in the external recording/reproducing apparatus 100, the number of parts can be decreased, and thus the rate of failure or of exchange can be drastically decreased. In addition, since the VCM coil 6 is driven without contact with the external recording/reproducing apparatus 100, and the spindle 7 is rotated by the external spindle motor 106 without contact, deterioration due to wear of parts is prevented. By decreasing the number of parts and by preventing the deterioration due to wear of parts, the hard disc device suitable for preserving recording information for a long time can be provided.

Since the heavy VCM magnet 101 and the spindle motor 106 are not built-in, the reduction in size and weight can be achieved, and thus portability can be improved. Moreover, the decrease in the number of parts may reduce the cost.

In addition, since the power circuit 9 receives power supply without contact and the communication unit 8 transmits and receives signals by optical communication or by radio high-frequency transmission, connectors for supplying power and for transmitting and receiving signals is omitted, which makes it possible to further decrease the number of parts. Moreover, the connection made by the connectors is also omitted, which can prevent the deterioration due to wear of the connectors.

The portable hard disc device 1 of the present embodiment is a recording medium which has the portability similar to an optical disc, which can record a large amount of data than the optical disc, and which is suitable for recording huge amount of information therein at an affordable price. The hard disc device 1 can record video software title more than existing recording media such as DVD software, and thus is more suitable for recording video software. In the case of recording reproducing-only information such as video software, since the hard disc device is good enough only for reading, the head slider 4 can be simplified by being composed of a reading head.

Figure 5A:
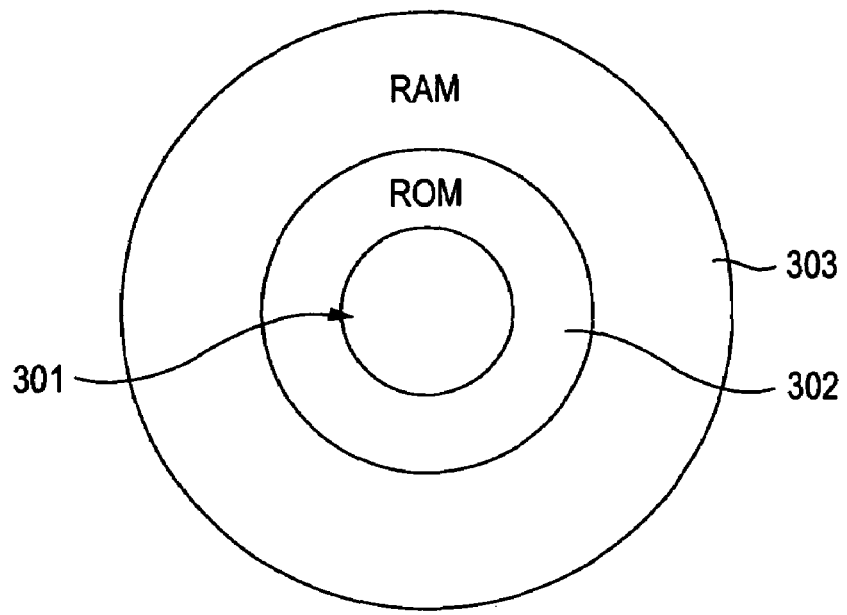
FIGS. 5A and 5B are views showing an arrangement of an RAM area and a ROM area in a disc.
Figure 5B:
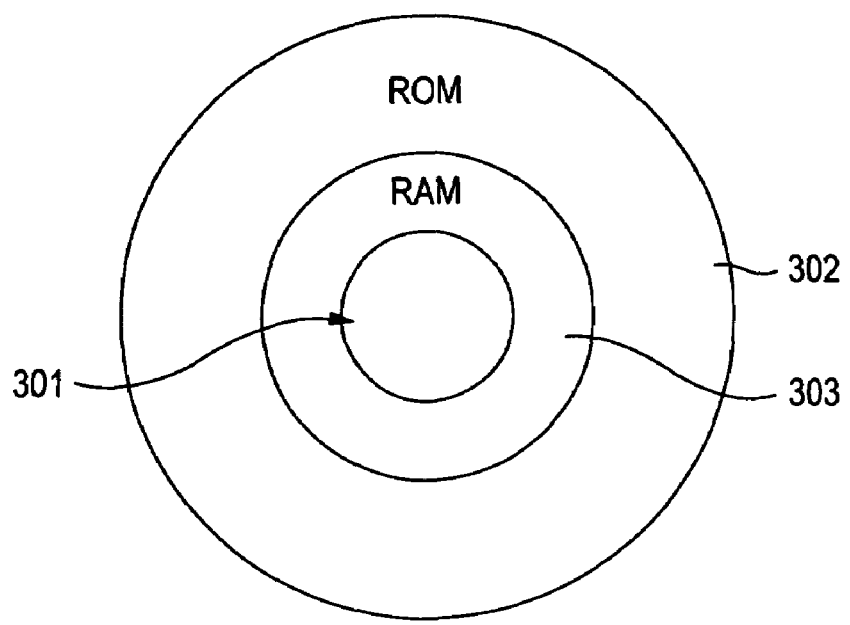

In the above embodiment, the hard disc device 1 is read-only, and the disc 3 is composed of a read-only ROM. However, as shown in FIGS. 5A and 5B, a ROM area 302 and a RAM area 303 may be provided in the disc 3. FIG. 5A shows an example in which the ROM area 302 is provided inside (on the opening 301 side) and the RAM area is provided outside. FIG. 5B shows an example in which the RAM area 303 is provided inside and the ROM area 302 is provided outside.

In the case of constructing the hard disc device 1 for recording/reproducing, the head slide 4 is composed of a reading head or a recording head in the above embodiment, and the communication unit 8 receives recording data from the communication unit 109 of the recording/reproducing apparatus 100.

As in the present embodiment, if the RAM area 303 is provided in the disc 3, video software or the like can be provided to users after recording them in the ROM area 302. Moreover, information for managing huge amount of data, for example, names of respective titles of video software can be written in by users.

What is claimed is:

1. A portable read-only hard disc device which is read by a recording and/or reproducing apparatus, comprising:
    a disc on which information is recorded by recess and projection formed by nano-imprinting;
    a read-only head slider;
    a secondary coil constituting a transformer together with a primary coil provided in the recording and/or reproducing apparatus;
    a power circuit having a rechargeable battery which accumulates power supplied from the secondary coil;
    an arm mechanism for moving the head slider to a predetermined position;
    a voice coil motor type coil for driving the arm mechanism after being driven by a current supplied from the power circuit and magnets provided in the recording and/or reproducing apparatus;
    a spindle which is driven without contact by a spindle motor provided in the recording and/or reproducing apparatus, after the disc is fixed; and
    a communication unit for transmitting and receiving reproducing signals and servo signals from the disc, and driving signals bound for the voice coil motor type coil to and from the recording and/or reproducing apparatus by at least one of an optical communication and a radio high-frequency transmission;
    wherein the power circuit receives power supply from the recording and/or reproducing apparatus without mechanical contact.

2. A portable hard disc device which is read by a recording and/or reproducing apparatus, comprising:
    a disc for recording and/or reproducing;
    a head slider for recording and/or reproducing the disc;
    an arm mechanism for moving the head slider to a predetermined position;
    a voice coil motor type coil for driving the arm mechanism by being driven by an external magnetic field generated by magnets provided in the recording and/or reproducing apparatus and a current supplied from a power circuit;
    a spindle for rotating the disc after the disc is fixed;
    a power circuit for supplying a current to the voice coil motor type coil; and
    a communication unit for transmitting and receiving reproducing signals and servo signals from the disc, and driving signals bound for the voice coil motor type coil to and from the recording and/or reproducing apparatus by at least one of an optical communication and a radio high-frequency transmission,
    wherein the power circuit receives power supply from the recording and/or reproducing apparatus without mechanical contact.

3. The hard disc device according to claim 2, wherein the spindle is driven without contact by a spindle motor provided in the recording and/or reproducing apparatus.

4. The hard disc device according to claim 2, wherein the disc is used as a reproducing-only ROM.

5. The hard disc device according to claim 2, wherein the disc includes a ROM area to be used as a read-only ROM, and an area to be used as a readable and writable RAM area.

* * * * *